(No Model.)

W. J. DUNN.
EXTENSIBLE BRACE FOR EXCAVATIONS.

No. 456,649. Patented July 28, 1891.

WITNESSES:
J. W. Geyser
Geo. Geyser

INVENTOR
William J. Dunn
BY J. B. Geyser.
ATTORNEY.

UNITED STATES PATENT OFFICE.

WILLIAM J. DUNN, OF EMSWORTH, PENNSYLVANIA.

EXTENSIBLE BRACE FOR EXCAVATIONS.

SPECIFICATION forming part of Letters Patent No. 456,649, dated July 28, 1891.

Application filed April 14, 1891. Serial No. 388,895. (No model.)

*To all whom it may concern:*

Be it known that I, WILLIAM J. DUNN, a citizen of the United States, residing at Emsworth, in the county of Allegheny and State of Pennsylvania, have invented certain new and useful Improvements in Extensible Braces for Excavations; and I do declare the following to be a full, clear, and exact description of the invention, such as will enable others skilled in the art to which it appertains to make and use the same, reference being had to the accompanying drawings, and to the figures of reference marked thereon, which form a part of this specification, like figures referring to like parts.

Figure 1:
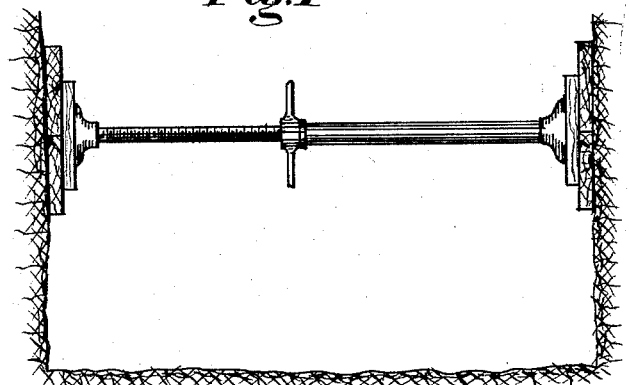
Figure 2:
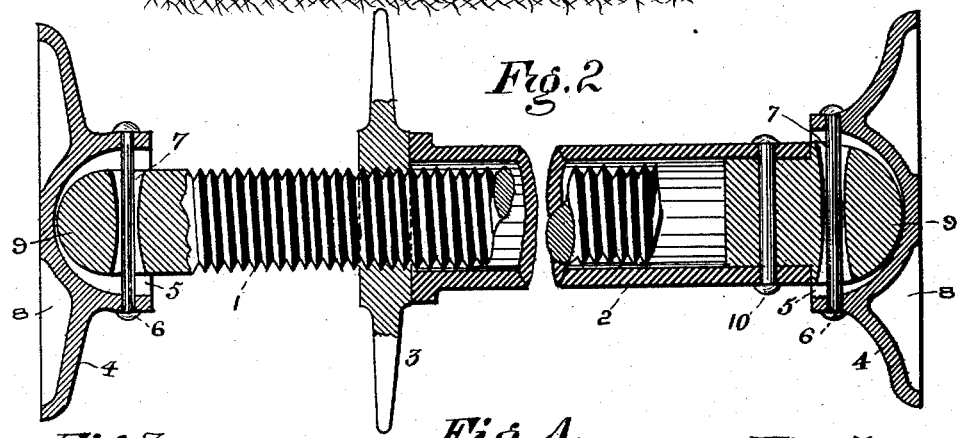
Figure 3:
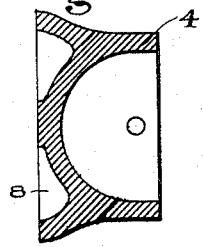
Figure 4:
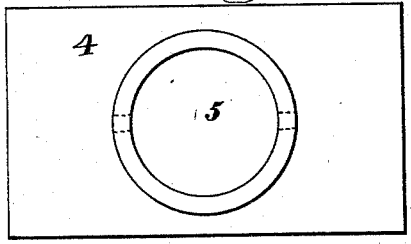
Figure 5:
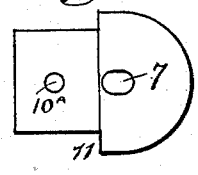
Figure 6:
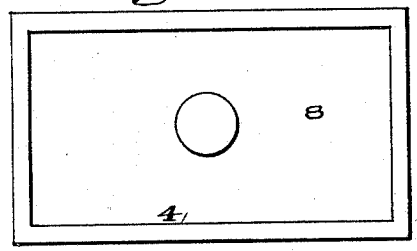

In the drawings, Figure 1 illustrates the brace as it appears in actual use. Fig. 2 is an enlarged view, partly in section, showing the construction and position of the various parts. Fig. 3 is a cross-section of the shoes 4. Fig. 4 is a top view, and Fig. 6 a bottom view, of the same; and Fig. 5 shows the form of plug used to close the end of the sleeve 2.

In making deep cuts in the earth to lay pipe, sewers, &c., it is necessary to provide supports to prevent the walls from falling in. Planking is used on the sides and cross-bracing to retain them in place, extensible braces being the most easily adjusted.

In Fig. 2 I show the various parts of my brace as they appear when joined together and ready for use. Reference-numeral 1 is the stem of the extensible part, made of wrought-iron, one and one-half inch in diameter and eighteen or twenty long, having a substantial screw-thread cut upon the major portion of its length, and the end 9 is welded into a hemispherical shape, and close to the hemispherical part thereof it is pierced by an oblong hole 7, with curved sides. 2 is a wrought-iron tube or sleeve of any desired length, with inner diameter large enough to admit 1 easily. One end of 2 is finished with a plug (see Fig. 5) of the same shape as the rounded end of 1, and is furnished with a similar oblong hole 7 and a shoulder 11, to prevent its entrance into the sleeve 2 when under pressure, and a round rivet-hole 10^A, through which by the straight rivet 10 it is securely fastened to the end of the tube. The other end of the tube is re-enforced, as shown, to form a substantial bearing for the nut 3, engaging and moving upon the thread of 1. This nut 3 has two projecting arms to admit a powerful leverage in extending the brace.

The shoes 4 are provided with the deep conical recess 5, with walls extending above the center of the curve and somewhat larger in diameter than the ends of 1 and 2, so as to admit of a certain amount of adjustment in any direction of the extensible part of the brace, and yet give 9 a substantial seat at all times. The straight rivets 6 pass through the walls of the recesses and through the oblong holes 7 of the stems, and thus securely fasten the shoes thereon, at the same time allowing a large amount of angular adjustment. The rivet 6 also prevents the turning of parts when the nut 3 is revolving. The bottoms of the shoes are hollowed out, as shown at 8, thus forming an edge, and when the brace is worked this edge compresses the plank to a certain extent, and thereby secures a hold on the same, preventing slip.

The advantages of my brace are that the ends 9 of the extensible pieces have a deep socket, from which they cannot escape while under strain; that the rivet 6, which holds the shoes to the ends of the extensible parts, are when the brace is once in position relieved of all labor and cannot become bent or clog the working of the other parts, and that there can be no slip either in the socket, on the rivet, or at the base of the shoe when once in place and the pressure of the adjusting-screw put on.

I am aware that braces of a character analogous to mine have been constructed; but they have been defective, being adjustable in only a slight degree and subject to constant disorder from slipping of the shoe, gagging of the screw, and displacement of the parts. In my braces all this is avoided and the danger to those working beneath them entirely removed. The placing of the braces in position is also made an easier task to the men by the deep-walled sockets of the shoes and the angular play allowed in any direction therefrom.

The screw-stem, nut-sleeve, and shoes have in various forms been utilized in braces, and I do not claim them, broadly; but the form herein shown and described is original, and

I claim and desire to secure by Letters Patent—

1. In a brace of the character described, the combination of the shoes having deep sockets, the walls thereof provided with holes for the placing of a straight rivet, and two adjustable parts or sections having their outer ends fitting in said sockets and provided with oblong holes for the passage of the rivet by which they are joined to the sockets, and which prevents the rotation of the adjustable parts, substantially as described.

2. In a brace of the character described, the combination of the plug provided with a rounded end and oblong hole for the rivet, and having a shoulder to prevent its entrance into the sleeve, with the sleeve covering the screw, and to which the plug is joined by the rivet 10, substantially as described.

3. In a brace of the character described, the combination of the deep-socketed shoes having rivet-holes in their walls, the screw with rounded head provided with oblong rivet-hole, the sleeve in which the screw moves, the plug riveted to the sleeve and the oblong hole therein, the straight rivets by which the shoes are connected to screw and sleeve, and the nut engaging the screw.

In testimony whereof I affix my signature in presence of two witnesses.

WILLIAM J. DUNN.

Witnesses:
A. C. HENRY,
J. B. GEYSER.